(12) United States Patent
Angelidis et al.

(10) Patent No.: US 8,952,968 B1
(45) Date of Patent: Feb. 10, 2015

(54) WAVE MODELING FOR COMPUTER-GENERATED IMAGERY USING INTERSECTION PREVENTION ON WATER SURFACES

(75) Inventors: Alexis Angelidis, Albany, CA (US); Gary Bruins, Benicia, CA (US)

(73) Assignee: Pixar, Emeryville, CA (US)

(*) Notice: Subject to any disclaimer, the term of this patent is extended or adjusted under 35 U.S.C. 154(b) by 458 days.

(21) Appl. No.: 13/287,915

(22) Filed: Nov. 2, 2011

(51) Int. Cl.
*G06T 13/40* (2011.01)
*G06T 13/00* (2011.01)
*G06T 15/04* (2011.01)

(52) U.S. Cl.
USPC ............................................ 345/473; 345/585

(58) Field of Classification Search
CPC . G06F 17/5022; G06F 17/5036; G06F 13/40; G06F 13/00; G06F 13/80
See application file for complete search history.

(56) References Cited

U.S. PATENT DOCUMENTS

2005/0228625 A1* 10/2005 Lachman ........................... 703/9
2007/0151336 A1* 7/2007 Lake ........................... 73/290 V

OTHER PUBLICATIONS

Van Elsas, P.A., "Free-form Displacement Features in Conceptual Shape Design" Thesis dissertation, Date: Oct. 20, 1997, Delft University Press, ISBN: 90-407-1523-8.*
A. Veltcheva et al. "Comparison of methods for calculation of the wave envelope", unit of Marine Technology and Engineering Technical University of Lisbon, Received Jan. 31, 2002; accepted Mar. 14, 2002.*
Simplification Envelopes, Proceedings of SIGGRAPH 96 (New Orleans, LA, Aug. 4-9, 1996). In Computer Graphics Proceedings, Annual Conference Series, 1996, ACM SIGGRAPH, pp. 119-12, Cohen et al.*
Tessendorf, Jerry; "Simulating Ocean Water"; copyright© 1999-2001, Jerry Tessendorf, pp. 3-1 thru 3-19.
Scheepers, F., and A. Angelidis, A., "Atmos: A System for Building Volume Shaders," in *ACM SIGGRAPH 2008 talks*, ACM, Siggraph '08, 64:1-64:1.

* cited by examiner

*Primary Examiner* — Ulka Chauhan
*Assistant Examiner* — Saptarshi Mazumder
(74) *Attorney, Agent, or Firm* — Kilpatrick Townsend & Stockton LLP (57) ABSTRACT

A wave modeler usable with a rendering engine and for generating surface models usable for rendering images of scenes having surfaces therein reads user inputs including a desired displacement value, determines a vertical displacement wave representing displacements along a wave, determines a plurality of sample points each having an ordinal position on the vertical displacement wave, determines a horizontal displacement wave, maps the horizontal displacement wave to the plurality of sample points, adjusts horizontal displacement of one or more of the plurality of sample points to prevent, avoid or reduce intersection of the wave with itself, and generates a representation of the wave that is storable as a geometric model usable by a rendering image to generate an image with corresponding displacements of the wave.

25 Claims, 10 Drawing Sheets

WAVE MODELING FOR COMPUTER-GENERATED IMAGERY USING INTERSECTION PREVENTION ON WATER SURFACES

FIELD OF THE INVENTION

The present invention relates to the field of computer graphics, and in particular to methods and apparatus for realistically animating and rendering water and similar surfaces in general, as well as animating and rendering waves and wave action.

BACKGROUND

Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

The scene is typically defined by a geometric model that specifies the location and characteristics of objects, their surfaces, etc., as well as lighting wherein object locations can be specified using a 3D coordinate system where a camera viewpoint and view surface might also be positioned in the 3D coordinate system. The generation of images from geometric models is complex enough that most images expected by consumers/users of such images require some sort of processing or computer functionality in order to generate the images. Such a system can be referred to as a renderer.

The inputs to a renderer, typically in a prespecified format, include the geometric model that describes where all of the objects to be used for the image are. A modeling station might comprise a computer with input devices and output devices to accept user input and provide output feedback. With a modeling station, a user can create geometric models. For example, a user might specify a red ball centered at coordinates (X1, Y1, Z1) with radius R1, a point light source at coordinate C2, and so on. Where there is a manageable number of objects, perhaps a user could manually input all of the objects, and could manually input instructions about the movement of those objects (e.g., reduce the lighting intensity by 5% per frame, move the red ball 30 pixels to the left per frame). However, many scenes require too many objects for a user of the modeling station to manually or explicitly enter.

For example, where a scene contains a realistic looking tree, surface of water with waves, or large numbers of objects, it is impractical to have the user enter all the details and some of those details need to be generated by other programs, such as shaders, physics engines, kinematic engines and other well-known tools of computer-generated imagery.

Typically, a program that generates elements or objects for a model accepts some user inputs for "controls" on those objects. For example, the aforementioned ball might have a control for translation, radius sizing, and color. Using the controls, the user can specify and change a location, radius and color and a modeling program would, based on those controls, generate a suitable object to include with the geometric model. While the ball example is a simple example, there are other objects for which some controls are provided and the object is generated with fewer degrees of freedom than would be possible if the artist or user specified the object more particularly.

Waves are a good example. An artist might use a modeling station to manually create an image of choppy seas be specifying each piece of the water surface, being careful to make them blend in a natural-looking way, and keep that consistent from frame to frame. However, that is impractical for all put the simplest or cartoonish images. Instead, a modeling program is provided that takes in user controls—e.g., size of wave, color of water, speed of waves, and other high-level parameters—and generates the geometric model of choppy seas that can be rendered by a renderer.

The controls should be variables or variations that a user is likely to use, such as wave height and wind velocity, rather than variables that do not intuitively translate to characteristics an artist or user would use to describe the effect they seek to create. Otherwise, creating objects might become tedious and error-prone. For example, size of waves, variability of waves, apparent wind speed, water density and similar characteristics might be variables that a user wishes to vary in order to get to a desired visual effect, whereas the specific positions of each unit of water is not a variable the user might be interested in having to deal with. Of course, if the user could practically set each small volume of water in just the right place, the desired result could be obtained, but that is not feasible. On the other end, the user might have controls limited to wave height, a distribution of wave frequency, and a few other controls, which a wave modeling program would then translate to wave objects or water surfaces, which could then be rendered.

With a kinematic engine, parameters are provided as inputs and the kinematic engine computes the movements of objects based on the input properties. If accurately modeled, the resulting motion is often "plausible" and seemingly realistic to a viewer. The process of determining the motion of objects such that it is independent of history is called herein a "kinematic process," while the software/computer hardware that performs the process is called herein a "kinematic system." Typically, the software and mathematics underlying kinematic motions of this nature are highly complex.

Prior wave simulators are limited in some ways that make it difficult to achieve desirable results, so improvements in wave simulators is desirable.

REFERENCES

[Scheepers and Angelidis] Scheepers, F., and Angelidis, A., "Atmos: a system for building volume shaders," in *ACM SIGGRAPH* 2008 *talks*, ACM, SIGGRAPH '08, 64:1-64:1.

[Tessendorf] TESSENDORF, J., "Simulating ocean surface," in *ACM SIGGRAPH* 2004 *Course*, ACM, SIGGRAPH, January 2004.

BRIEF SUMMARY OF THE INVENTION

A wave modeler usable with a rendering engine and for generating surface models usable for rendering images of scenes having surfaces therein reads user inputs including a desired displacement value, determines a vertical displacement wave representing displacements along a wave, determines a plurality of sample points each having an ordinal position on the vertical displacement wave, determines a horizontal displacement wave, maps the horizontal displacement wave to the plurality of sample points, adjusts horizontal displacement of one or more of the plurality of sample points to prevent, avoid or reduce intersection of the wave with itself, and generates a representation of the wave that is storable as a geometric model usable by a rendering image to generate an image with corresponding displacements of the wave.

The following detailed description together with the accompanying drawings will provide a better understanding of the nature and advantages of the present invention.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4 illustrates problems with excessive choppiness.

FIG. 6 shows displacements of sample points for low choppiness (FIG. 6(a)), for medium choppiness (FIG. 6(b)), and for high choppiness (FIG. 6(c)).

FIG. 7 shows 1D waves corresponding to the sample points of FIG. 6.

DETAILED DESCRIPTION OF THE INVENTION

Wave simulation is not a simple process, but when done poorly, the resulting rendering does not "look right." At the same time, a user cannot be expected to specify thousands or millions of wave features in order to make it look right. In one wave simulation process, the input is a distribution of wave frequencies. From a table of frequencies, the wave simulator might run an inverse Fourier transform in two dimensions to produce thousands of wavefronts and build a water surface from that result.

As should be understood, while the invention can be implemented entirely in software, the steps of a typical process of animation or computer-generated imagery must be done with some sort of computation or data manipulation, as the resolutions and results expected cannot be done manually in a reasonable fashion.

Figure 1:
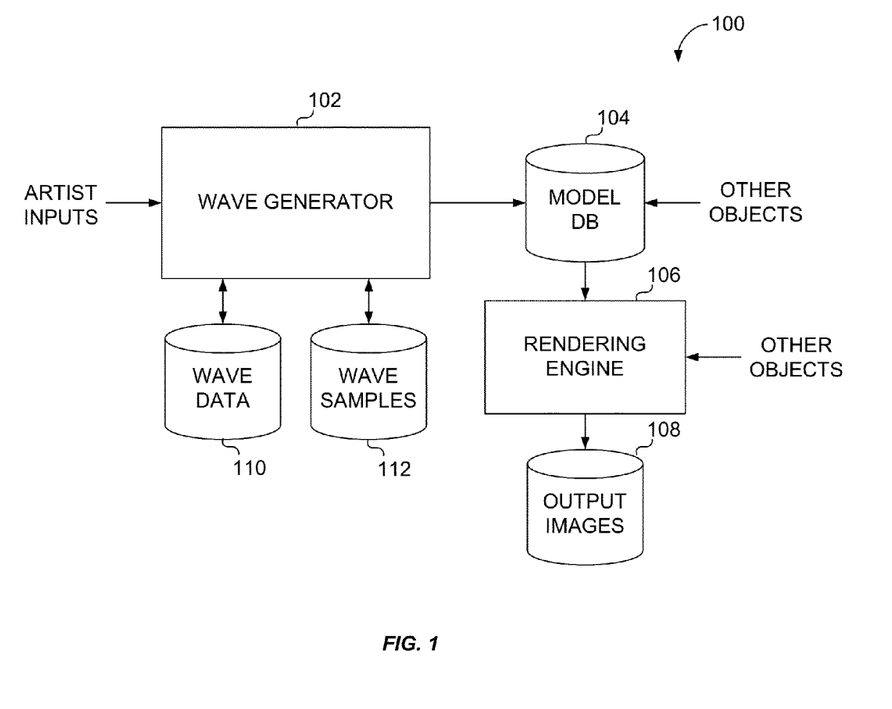
FIG. 1 illustrates an example of a system for rendering images that include surfaces that have waves.

FIG. 1 illustrates an example of a system 100 for rendering images that include surfaces that have waves. This system can be implemented in software that runs on particular hardware, or perhaps runs using a general purpose processor, where program code is stored on computer readable medium that provides the functionality of the rectangles in FIG. 1, where the processor is able to interface to storage elements (cylinders) in the system of FIG. 1, so that processes running on the processor (or processors) can access the data as indicated.

System 100 comprises a wave generator 102 that receives artist (or other nonartist user, or perhaps another computer process) input, reads (and possibly writes) wave data from a wave data store 110, reads wave samples from a wave sample store 112 and outputs waves or representations of elements of waves to a model database 104. Model database might also contain other objects, such as boats, sky, clouds, land, lighting, characters, etc. A model from model database 104 might fully specify a scene or an animation sequence, by specifying objects, effects and the like of one or more scenes. A rendering engine 106 can then process those models to form one or more output images that can be stored into an image store 108.

Of course, a user might manually specify a wavy surface of, say, an ocean in view in a scene, perhaps using a vector displacement tool or other tools for providing a texture or bump map to a surface. However, using a wave generator would provide natural (or unnatural) results intended by the artist without requiring specification of each little bump in the surface. The wave generator can model and simulate a water surface using much fewer user inputs than would be required by a manual surface specification.

It is known to use modeling techniques to simulate ocean waves. See, for example, [Tessendorf]. However, since modeling necessarily uses fewer inputs than manual creation of the surface, there are times when the model produces undesirable results. In such cases, the artist might just have a rule of thumb that limits expression. For example, it may be that waves beyond a certain choppiness do not look right, so the artist will settle for animations where the ocean surface might not be as choppy as desired.

In a novel wave generator, multiple ranges of wave frequency are provided, where the artist can separately provide controls for different ranges. A "control" is a user input that can be used to vary the operation of some element. For example, the user might be provided with a way to enter a "wave height" value with some control (a keyboard used with a form field, a mouse and a scroll bar, or some other method or means of providing the input) such that a process can receive and store the desired "wave height" value. As used herein, a control can provide user or computer input to a process in a form expected by that process. The control might also have a feedback element. For example, an artist modeling station might include an input device and a display, with programming to accept user inputs, modify a wave height, show an icon, dot or other screen element at a peak of a wave and allow the user to drag the element up and down (and perhaps side to side) as part of specifying the desired value, while the modeling station provides visual feedback as to the effect of that particular specified value.

An example of a modeling station might be a computer system having storage, a display, a keyboard and other input and/or output devices.

Figure 2:
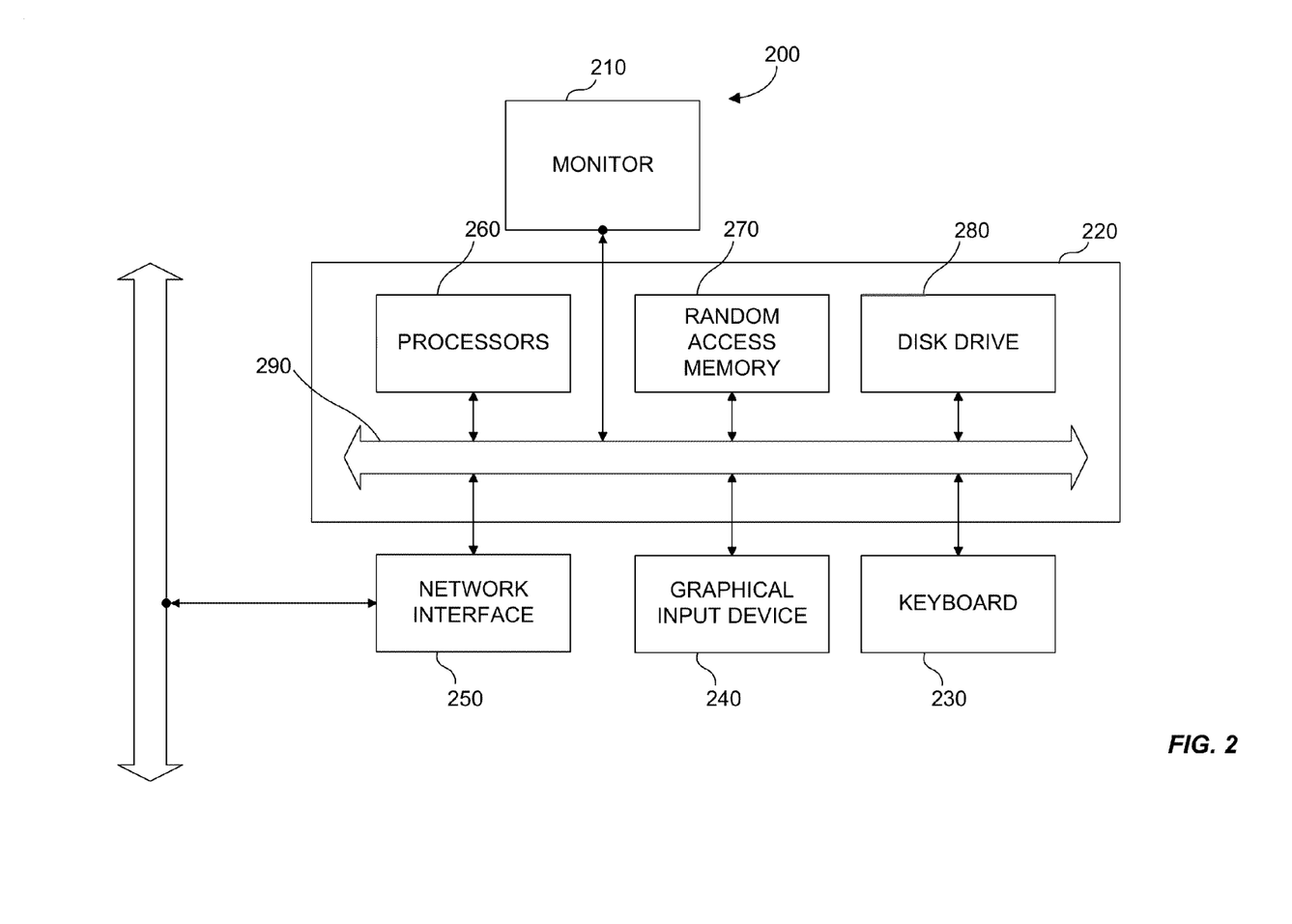
FIG. 2 illustrates an example computer system capable of implementing features of FIG. 1.

FIG. 2 illustrates an example computer system 200 capable of implementing features of FIG. 1. Computer system 200 typically includes a monitor 210, computer 220, a keyboard 230, a user input device 240, and a network interface 250. User input device 240 includes a computer mouse, a trackball, a track pad, graphics tablet, touch screen, and/or other wired or wireless input devices that allow a user to create or select graphics, objects, icons, and/or text appearing on the monitor 210. Embodiments of network interface 250 typically provides wired or wireless communication with an electronic communications network, such as a local area network, a wide area network, for example the Internet, and/or virtual networks, for example a virtual private network (VPN).

Computer 220 typically includes components such as one or more general purpose processors 260, and memory storage devices, such as a random access memory (RAM) 270, disk drives 280, and system bus 290 interconnecting the above components. RAM 270 and disk drive 280 are examples of tangible media for storage of data, audio/video files, computer programs, applet interpreters or compilers, virtual machines, embodiments of the herein described invention including geometric scene data, object data files, shader descriptors, a rendering engine, output image files, texture maps, and displacement maps. Further embodiments of computer 220 can include specialized audio and video subsystems for processing and outputting audio and graphics data. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Figure 3:
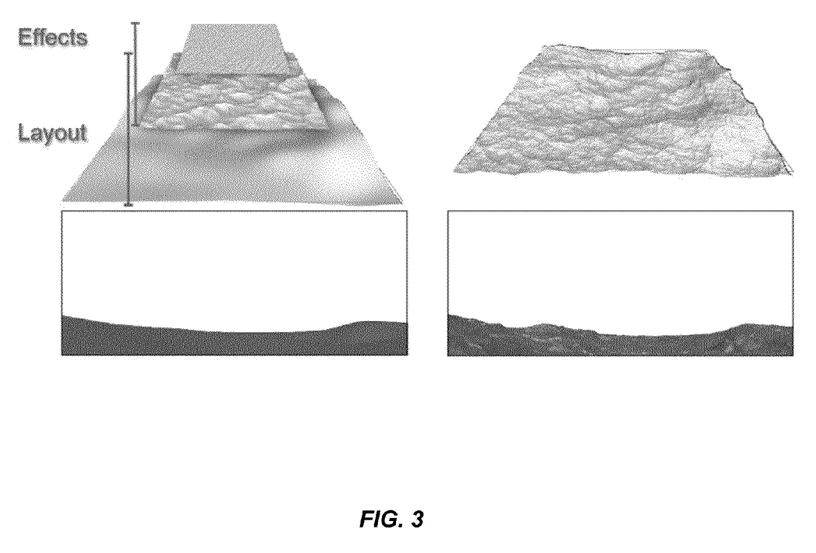
FIG. 3 illustrates how multiple layers might be used to specify waves.
Figure 4A:
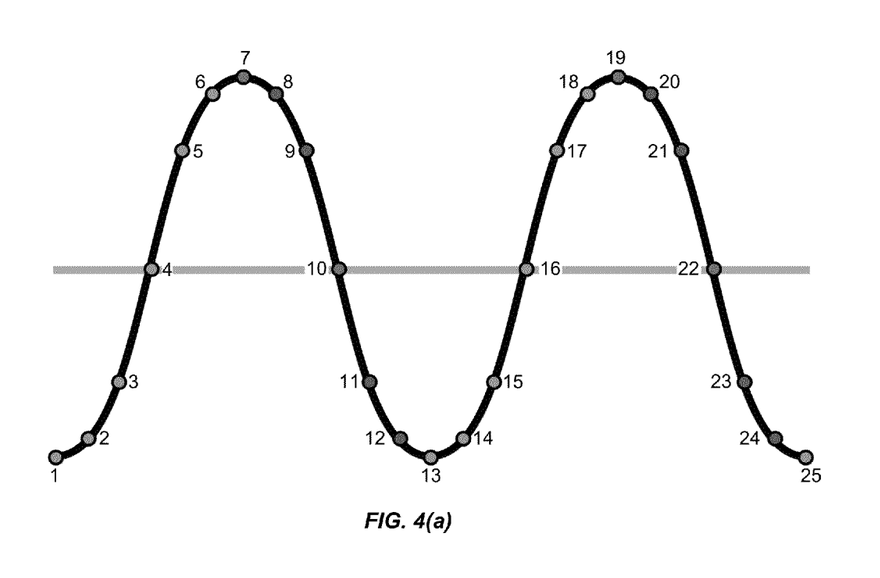
FIG. 4(a) shows a one-dimensional (1D) wave.
Figure 4B:
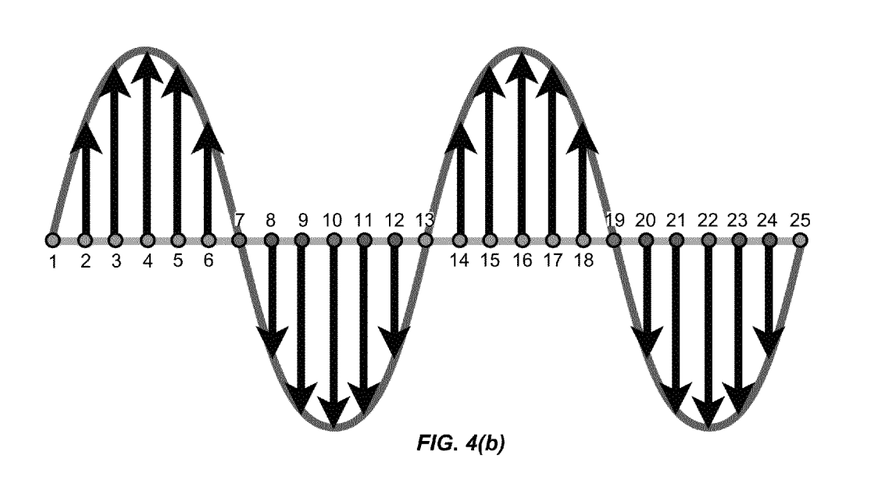
FIG. 4(b) shows a representation of left/right displacement applied to sample points of the wave.
Figure 4C:
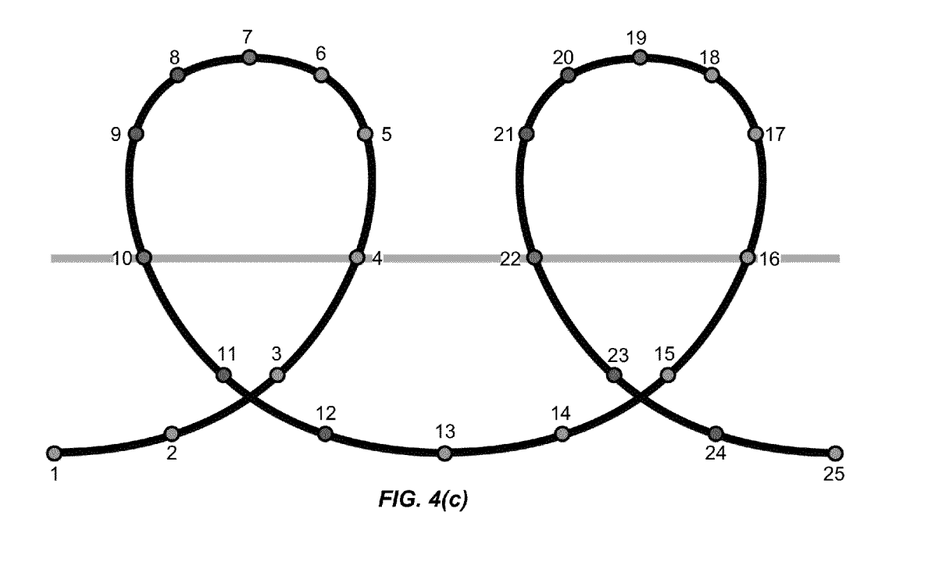
FIG. 4(c) shows the resulting intersections of wave surfaces.
Figure 4D:
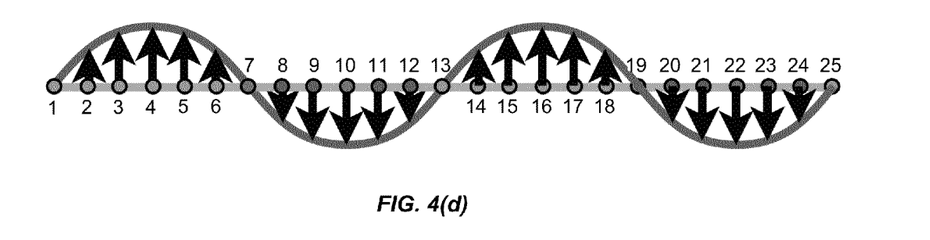
FIG. 4(d) shows lower left/right displacement.
Figure 4E:
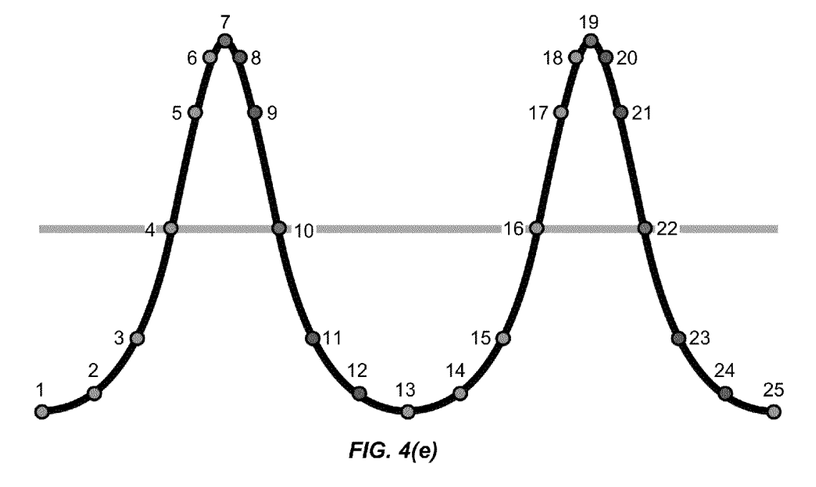
FIG. 4(e) shows the resulting wave.
Figure 4F:
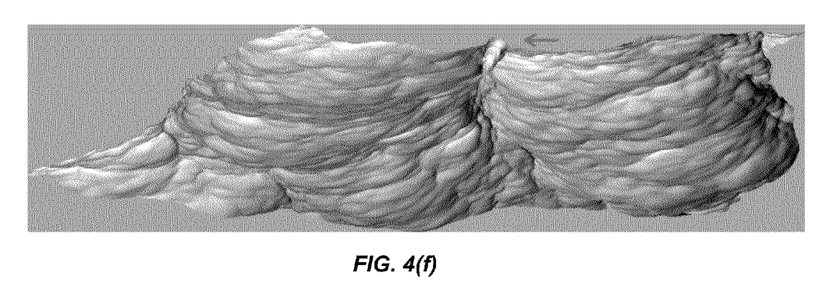
FIG. 4(f) shows the result of intersections on the rendering of images.

Using such a modeling station, a layout artist might provide a base ocean made of low frequency waves that would later be detailed in a seamless looking way, as illustrated in FIG. 3. One problem with simple wave manipulation is that waves would intersect and not look correct. Wave generator 102 implements a procedural self-intersection prevention mechanism that allows waves to look as cuspy as visually required without self-intersections. To avoid the memory cost of a finely tessellated mesh capturing the tiny detail of the waves, in some embodiments, the geometry provided to model database 104 is rendered as displacements of a surface rather than being represented by mesh of polygons. A combination of the two might be used as well.

Rather than simulating the ocean water and the splash together, the ocean can be decoupled from the splash with a frequency filter applied locally to remove the high and medium frequencies that would then be simulated. Note that while an ocean is used in many examples herein, the water being modeled and simulated could also be a non-ocean body of water or some smaller volume.

Wave Intersections

FIG. 4 illustrates problems with excessive choppiness. FIG. 4(a) shows a representation of a wave, as might be used for some one-dimensional (1D) slice of the way surface. This representation defines a displacement of the surface in 1D. Each of the points on the wave is a sample point. Suppose the sample points on the wave correspond to pixels or units or elements of the wave. Each of the sample points might be given an ordinal value (e.g., point 1, point 2, etc.). FIG. 4(b) shows a representation of the left/right displacement that might be applied to the sample points of the wave of FIG. 4(a) to convey choppiness. In FIG. 4(b), tall up-facing vectors correspond to larger right displacements than short up-facing vectors, while down-facing vectors correspond to an amplitude of left displacements. When those displacements are applied to the wave representation of FIG. 4(a), the result is intersections of wave surfaces, as illustrated in FIG. 4(c). The result might be as shown in FIG. 4(f). As a result, if an artist is varying a control to increase choppiness, but encounters wave intersections, the artist might opt for a lower choppiness setting, such as the left/right displacement of FIG. 4(d), which results in the wave of FIG. 4(e). Note that the waves don't intersect, but they might be rounder than desired.

As will be explained in more detail below, wave generator 102 addresses this problem in part by allowing the sample points to move around if needed to avoid intersection. Then, the model of the waves or surface can be represented by sample points that are displaced up/down (to increase wave amplitude) and left-right (to increase choppiness) while automatically insuring that the wave line defined by the sample points does not intersect itself as its sample points move about. It may be that an initial vertical displacement wave is a sine wave and the desired displacement value is a measure of desired side-to-side displacement relative to the sine wave.

Intersection-Free Ocean Choppiness

Given a subjective displacement function $f(p)=p+v(p)$ that sharpens ocean waves with self-intersections, we can define a subjective displacement function, $g(p)$, of similar magnitude and self-intersection free using Equation 1, where $f_k$ is a reduced displacement function $f_k(p)=p+kv(p)$ of reduction factor k, and where $\Omega$ denotes the function composition operator shown by Equation 2. In Equation 1, n is some integer large enough and defined as below.

$$g(p) = \left(\underset{i=1}{\overset{n}{\Omega}} f_{\frac{1}{n}}\right)(p) \qquad \text{(Eqn. 1)}$$

$$\underset{i=1}{\overset{n}{\Omega}} f = f \circ f \circ \ldots f \qquad \text{(Eqn. 2)}$$

Using the property of function composition, function $g()$ is bijective if function $f_k$ is bijective. Function $f_k$ is bijective if the determinant of its Jacobian (det $J_k(p)$) is strictly greater than zero. The determinant is shown in Equation 3, where $N(p)$ is the Jacobian of $v(p)$.

$$det\, J_k(p) = 1 + k(\text{trace}\, N(p)) + k_2 det\, N(p) \text{trace}(N^{-1}(p)) + k^3 det\, N(p) \qquad \text{(Eqn. 3)}$$

The function det $J_k(p)$ is a real polynomial in k. If it has no root in (0, 1), then k=1 satisfies the requirement. Otherwise, using the first root, $k_0$, in (0, 1) and the intermediate value theorem on $(0, k_0)$ provides that for any value of p, there exists some k>0 for which det $J_k(p)$>0.

Function $g()$ is of similar magnitude to function $f()$ if the sum of the reduction factors is one. The most straightforward reduction factors are uniform, as illustrated by Equation 4.

$$n = \left\lceil \frac{1}{k} \right\rceil \qquad \text{(Eqn. 4)}$$

In practice for ocean and other waves, $f()$ models choppiness as a two-dimensional (2D) horizontal displacement $f: \mathbb{R}^2 \mapsto \mathbb{R}^2$, and the number, n, that removes self-intersections is also low.

Figure 5:
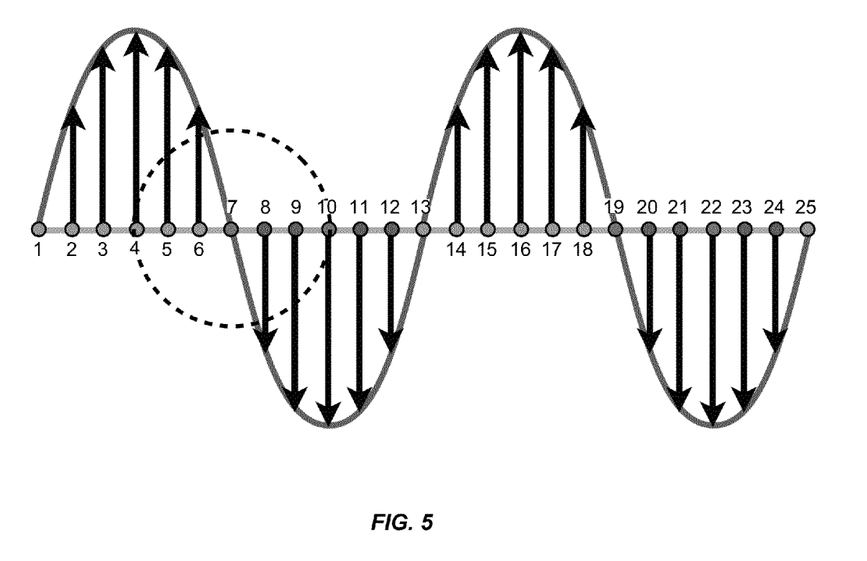
FIG. 5 illustrates a set of samples for a subjective displacement function.

FIGS. 5-7 provide an illustration of how a subjective displacement function without self-intersection might be represented. FIG. 5 illustrates a set of samples. The circled area contains some of the sample points that are likely to cause intersections. An intersection might be expected if the right displacement of a sample point in the left half of the circle (e.g., points 4-7) causes that sample point to be to the right of a sample point in the right half of the circle (e.g., points 7-10) after a left displacement of that right-side sample point.

However, using the techniques above, that intersection is automatically avoided.

Figure 6A:
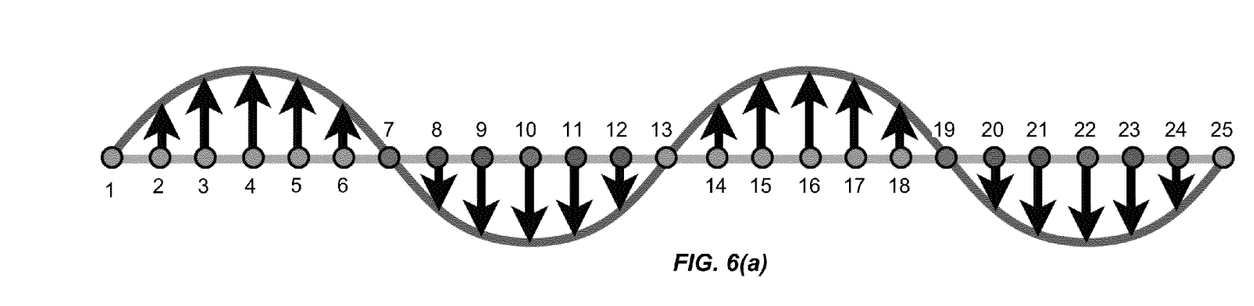
Figure 6B:
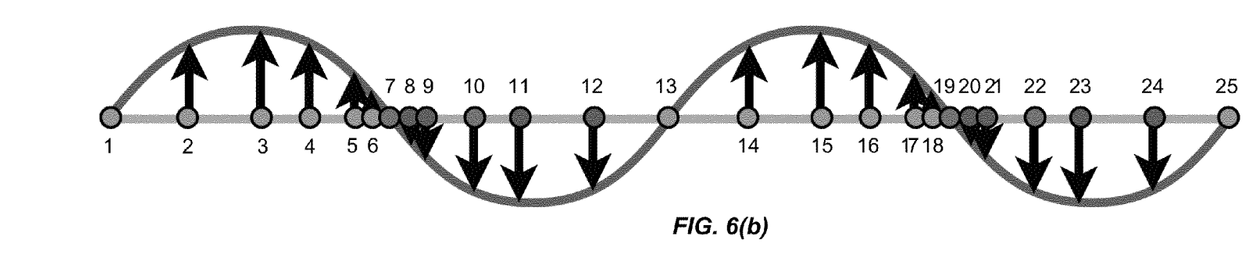
Figure 6C:
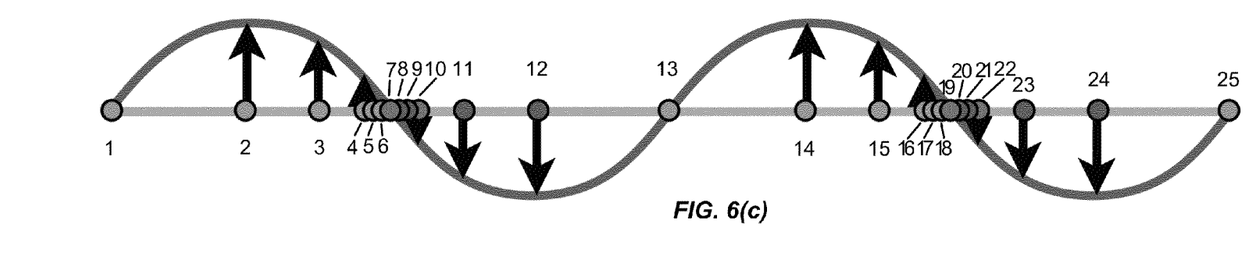
Figure 7A:
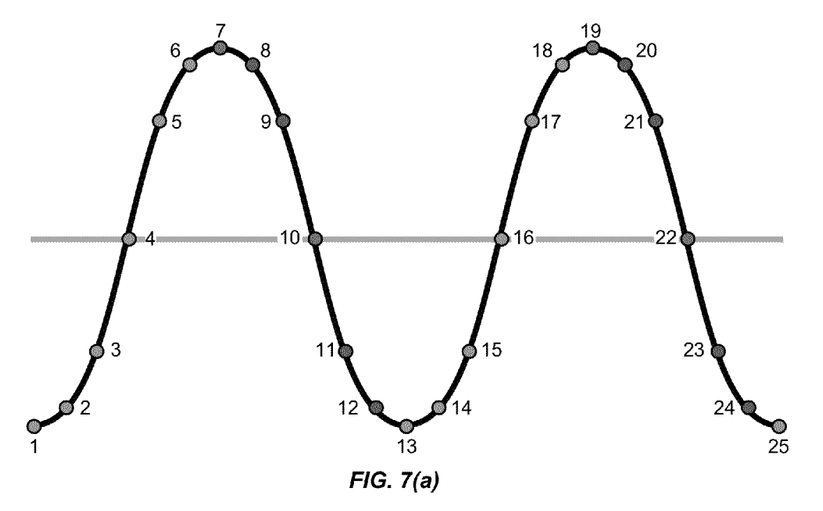
FIG. 7(a) shows the corresponding wave for low choppiness.
Figure 7B:
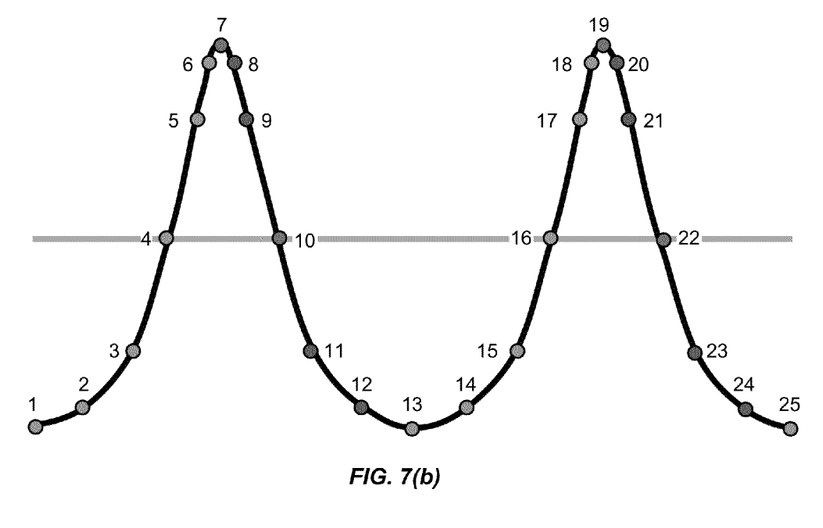
FIG. 7(b) shows the corresponding wave for medium choppiness.
Figure 7C:
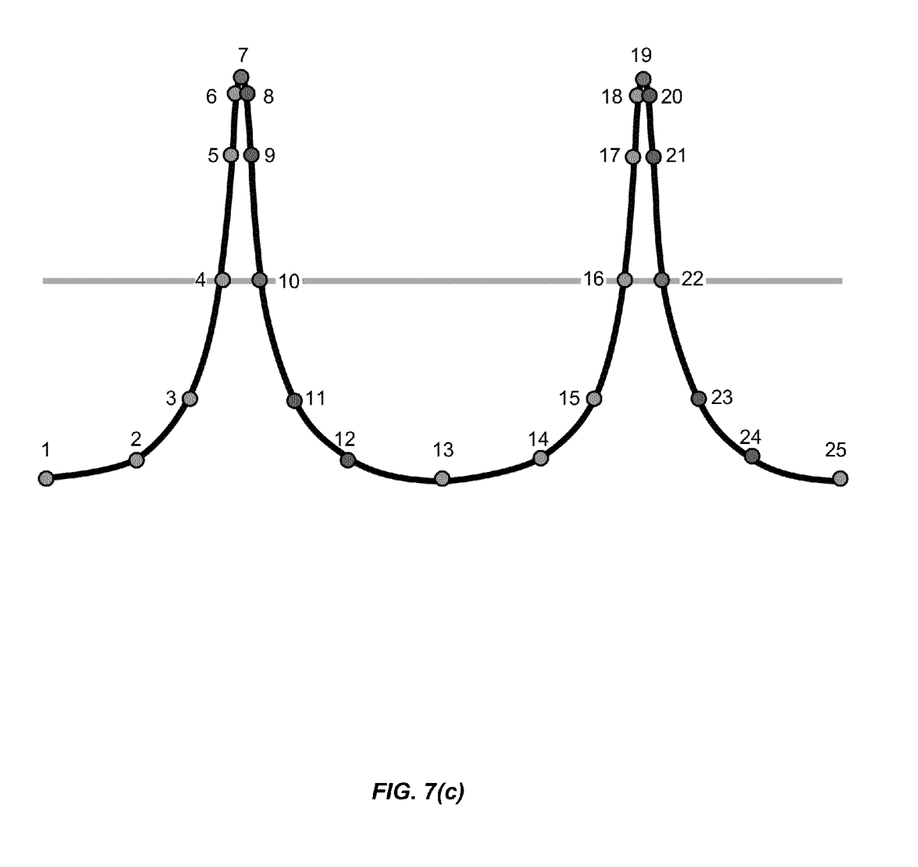
FIG. 7(c) shows the corresponding wave for high choppiness.

FIG. 6(a) shows the displacement of sample points for low choppiness and FIG. 7(a) shows the corresponding wave (in 1D). FIG. 6(b) shows the displacement of sample points for medium choppiness and FIG. 7(b) shows the corresponding wave (in 1D). Note that the sample points move such that the magnitudes cluster. FIG. 6(c) shows the displacement of sample points for high choppiness and FIG. 7(c) shows the corresponding wave (in 1D). Note that even under high choppiness, there is no intersection. The steps between the sample points are uneven in FIGS. 6(a)-(c). Choppiness can be specified by a user-input (or computer-input) value input to a wave generator or other modeling system.

In a more general case, a surface is provided (implicit or explicit) and sample points (in a sequence of 1D slices or in 2D) are selected such that a given set of sample points have an order and so could be used to define a curve (such as the sample points and curves of FIG. 4). User input is obtained as to high-level desired characteristics, such as wave frequency distribution, wave height and choppiness value(s). A wave generator or other modeling system will then determine the geometric model to provide to a renderer and/or to a shader (perhaps with only an implicit surface) where the determination takes into account the sample points and provides vertical and horizontal displacements to the sample points that fit the desired wave height and desired choppiness, but is configured so that self-intersections of the curve are not created (or are only sparingly present).

In some embodiments, a vertical displacement is made based on the desired wave height as shown in FIG. 5, for example, and then horizontal displacements are generated for those points. In some cases, the horizontal displacements are wavelike (as in the horizontal displacement waves shown in FIG. 6 superimposed over the displacement vectors of each of the sample points) and to prevent, avoid or reduce instances of self-intersection, the sample points are not evenly spaced along the axis of the horizontal displacement wave. The horizontal displacements might be defined by a horizontal displacement wave envelope, wherein a given horizontal displacement is determined by considering a sample point's position on an axis (related or not related to the sample point's position on the water surface). In such embodiments, it may be that the envelope doesn't change to prevent self-intersection of portions of the visible wave (which result from self-intersection of the curve connecting the sample points), but instead the coordinate of one or more sample point moves on the horizontal displacement axis (again, not necessarily involving a move of the sample point's position on the surface, but possibly so).

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is to be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems may be shown in block diagrams in order not to obscure the embodiments in unnecessary detail. In other instances, well-known processes, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. In a computer system for generating surface models usable for rendering images of scenes having a surface therein, a method of generating wave models comprising:
   reading a set of user inputs including a desired choppiness value;

determining a vertical displacement wave representing vertical displacements of a plurality of sample points on the surface from respective initial positions;

determining ordinal positions of the plurality of sample points on the vertical displacement wave;

determining an initial horizontal displacement function $f(p)=p+v(p)$ having as input p each of the plurality of sample points, wherein v(p) is dependent on the desired choppiness value;

forming an adjusted horizontal displacement function $$g(p) = \left(\underset{i=1}{\overset{n}{\Omega}} f_i\right)(p)$$

wherein $f_i(p)=p+k_i v(p)$, $\Omega$ denotes a function composition operator, n is a positive integer at least equal to 2, and $k_i$ are reduction factors chosen to have values in the interval (0, 1] and so that each function $f_i$ is bijective;

for one or more of the plurality of sample points, generating a respective horizontal displacement using the adjusted horizontal displacement function;

determining a visible wave on the surface, wherein the visible wave is represented at least by the plurality of sample points displaced vertically and horizontally using the respective vertical and horizontal displacements; and generating a representation of the visible wave that is storable as a geometric model or shading model usable by a rendering image or a shader to generate an image of the visible wave.

2. The method of claim 1, wherein the vertical displacement wave is a sine wave and the desired choppiness value is a measure of desired side-to-side displacement of the plurality sample points relative to the sine wave.

3. The method of claim 1, wherein the initial positions for the plurality of sample points are evenly spaced over the surface being displaced.

4. The method of claim 1, wherein the reductions factors equal a single value 1/n, wherein n is the upper limit of the function composition operation $\Omega$ and is determined by $$n = \left\lceil \frac{1}{k} \right\rceil,$$

wherein k has a value in the interval (0, 1] and is such that a Jacobian of $f_k(p)=p+kv(p)$ has a positive determinant.

5. The method of claim 1, wherein horizontal displacements are two-dimensional (2D) horizontal displacements.

6. The method of claim 1, further comprising modifying the horizontal displacements to remove self-intersection present in the representation of the visible wave prior to horizontal displacement, and wherein the function v(p) further depends on the vertical displacement at the point p.

7. The method of claim 1, further comprising:

determining a horizontal displacement wave envelope, defined along a horizontal displacement wave axis;

locating at least some of the plurality of sample points along the horizontal displacement wave axis; and using a location along the horizontal displacement wave axis and the horizontal displacement wave envelope to determine horizontal displacements for the at least some of the plurality of sample points, wherein the horizontal displacement wave envelope and placement of the at least some of the plurality of sample points along the horizontal displacement wave axis is such that self-intersection is prevented.

8. A rendering system for images from models, comprising:

one or more processors;

inputs for model parameters;

inputs for a set of user inputs including a desired choppiness value;

a wave generator, coupled to the inputs for the set of user inputs and to the one or more processors, and configured to modify wave models for a surface according to the desired choppiness value, and determine a vertical displacement wave representing vertical displacements of a plurality of sample points on the surface from respective initial positions;

computer-readable storage, coupled to the wave generator and the one or more processors, and configured to store at least the set of user inputs, the desired choppiness value, the vertical displacements, positions of the plurality of sample points and comprising logic that when executed performs a method comprising:

reading the set of user inputs and desired choppiness value;

determining an initial horizontal displacement function $f(p)=p+v(p)$ having as input p each of the plurality of sample points, wherein v(p) is dependent on the desired choppiness value;

forming an adjusted horizontal displacement function $$g(p) = \left(\underset{i=1}{\overset{n}{\Omega}} f_i\right)(p)$$

wherein $f_i(p)=p+k_i v(p)$, $\Omega$ denotes a function composition operator, n is a positive integer, and $k_i$ are reduction factors chosen to have values in the interval (0, 1] and so that each $f_i$ has a Jacobian with positive determinant when the determinant is evaluated at p;

for each of one or more of the plurality of sample points, generating a respective horizontal displacement using the adjusted horizontal displacement function; and determining a visible wave on the surface, wherein the visible wave is represented at least by the plurality of sample points displaced vertically and horizontally using the respective vertical and horizontal displacements; and a rendering engine for generating pixel color values for images corresponding to virtual scenes that include visible waves according to the wave models.

9. The rendering system of claim 8, wherein an initial vertical displacement wave is a sine wave and the desired choppiness value is a measure of desired side-to-side displacement of the plurality of sample points relative to the sine wave.

10. The computer-implemented rendering system of claim 8, wherein the initial positions for the plurality of sample points are evenly spaced over the surface being displaced.

11. The rendering system of claim 8, wherein, the reduction factors equal a single value 1/n, wherein n is the upper limit of the function composition operator $\Omega$ and is determined by $$n = \left\lceil \frac{1}{k} \right\rceil,$$

wherein k has a value in the interval (0, 1] and is such that the Jacobian of $f_k(p)=p+kv(p)$ has a positive determinant.

12. The rendering system of claim 8, wherein the horizontal displacements are two-dimensional (2D) horizontal displacements.

13. The rendering system of claim 8, wherein inputs allow for self-intersection in initial positions of sample points and the rendering system includes logic for removing such self-intersection present in the representation of the visible wave prior to horizontal displacement, and wherein the function v(p) further depends on the vertical displacement at the point p.

14. The rendering system of claim 8, further comprising storage for a horizontal displacement wave envelope, defined along a horizontal displacement wave axis and for locations of at least some of the plurality of sample points along the horizontal displacement wave axis.

15. A computer program product resident on a computer-readable tangible, non-transitory media comprises code executable by a processor, the computer program product comprising:
   program code for generating surface models usable for rendering images of scenes having a surface therein;
   program code for reading a set of user inputs including a desired choppiness value;
   program code for determining a vertical displacement wave representing vertical displacements of a plurality of sample points on the surface from respective initial positions;
   program code for determining ordinal positions of the plurality of sample points on the vertical displacement wave;
   program code for determining an initial horizontal displacement function $f(p)=p+v(p)$ having as input p each of the plurality of sample points, wherein v(p) is dependent on the desired displacement value;
   program code for forming an adjusted horizontal displacement function $$g(p) = \left( \underset{i=1}{\overset{n}{\Omega}} f_i \right)(p)$$

wherein $f_i(p)=p+k_iv(p)$, $\Omega$ denotes a function composition operator, n is a positive integer, and $k_i$ are reduction factors chosen to have values in the interval (0, 1] and so that each $f_i$ has a Jacobian with positive determinant when the determinant is evaluated at p;
   program code for generating, for each of one or more of the plurality of sample points, a respective horizontal displacement using the adjusted horizontal displacement function;
   program code determining a visible wave on the surface, wherein the visible wave is represented at least by the plurality of sample points displaced vertically and horizontally using the respective vertical and horizontal displacements; and
   program code for generating a representation of the wave that is storable as a geometric model usable by a rendering engine to generate an image of the visible wave.

16. The computer program product of claim 15, wherein the vertical displacement wave is a sine wave and the desired choppiness value is a measure of desired side-to-side displacement of the plurality of sample points relative to the sine wave.

17. The computer program product of claim 15, wherein the initial positions for the plurality of sample points are evenly spaced over the surface being displaced.

18. The computer program product of claim 15, wherein the reduction factors equal a single value 1/n, wherein n is the upper limit of the function composition operator $\Omega$ and is determined by $$n = \left\lceil \frac{1}{k} \right\rceil,$$

wherein k has a value in the interval (0, 1] and is such that the Jacobian of $f_k(p)=p+kv(p)$ has a positive determinant.

19. The computer program product of claim 15, wherein the horizontal displacements are two-dimensional (2D) horizontal displacements.

20. The computer program product of claim 15, further comprising program code for modifying the horizontal displacements to remove self-intersection present in the representation of the visible wave prior to horizontal displacement and wherein the function v(p) further depends on the vertical displacement at the point p.

21. The computer program product of claim 15, further comprising:
   program code for determining a horizontal displacement wave envelope, defined along a horizontal displacement wave axis;
   program code for locating at least some of the plurality of sample points along the horizontal displacement wave axis; and
   program code for determining horizontal displacements for the at least some of the plurality of sample points using a location along the horizontal displacement wave axis and the horizontal displacement wave envelope, wherein the horizontal displacement wave envelope and placement of the at least some of the plurality of sample points along the horizontal displacement wave axis is such that self-intersection is prevented.

22. The method of claim 1 wherein the values of the reduction factors are chosen so that all determinants of Jacobians of the $f_i(p)$ are positive.

23. The method of claim 4 wherein the determinant of the Jacobian of $f_k(p)=p+kv(p)$ is given by:
   $\det J_k(p)=1+k(\text{trace } N(p))+k^2\det N(p)\text{trace}(N^{-1}(p))+k^3\det N(p)$, wherein N(p) is the Jacobian of v(p).

24. The rendering system of claim 8 wherein the integer n is at least 2.

25. The computer program product of claim 15 wherein the integer n is at least 2.

* * * * *